Aug. 10, 1926.
R. L. DOOLITTLE ET AL
1,595,458
CONTROL VALVE
Filed Oct. 12, 1925    2 Sheets-Sheet 2
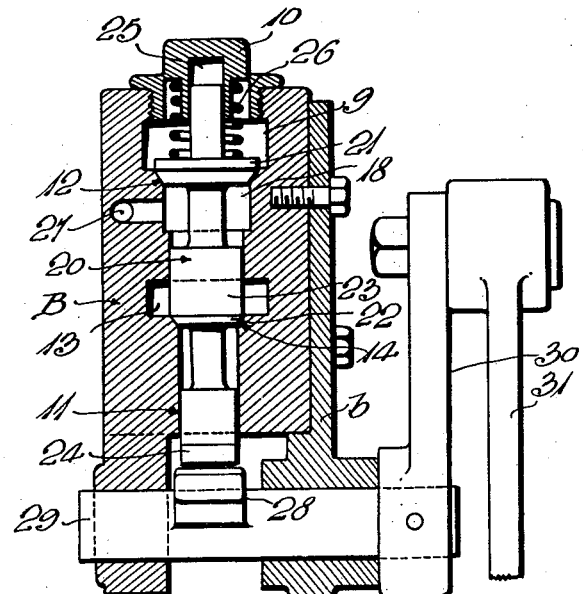
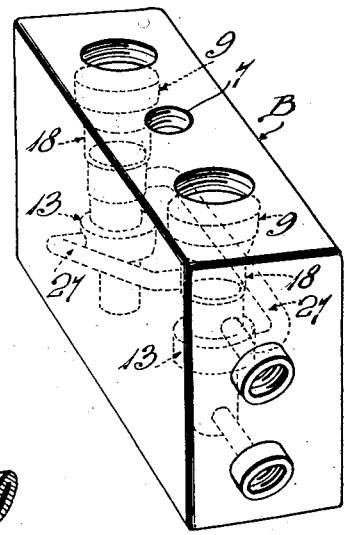
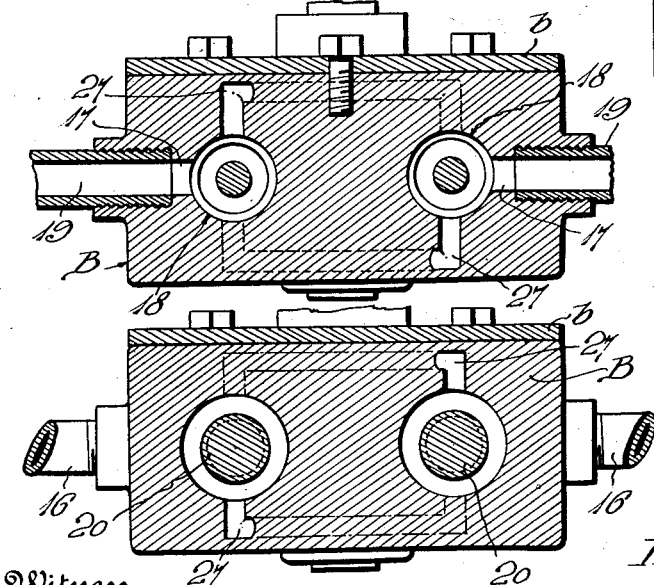
Inventors
R. L. Doolittle
W. C. Hunter
By H. R. Willson Yeo
Attorneys
Witness
H. Woodard Patented Aug. 10, 1926.

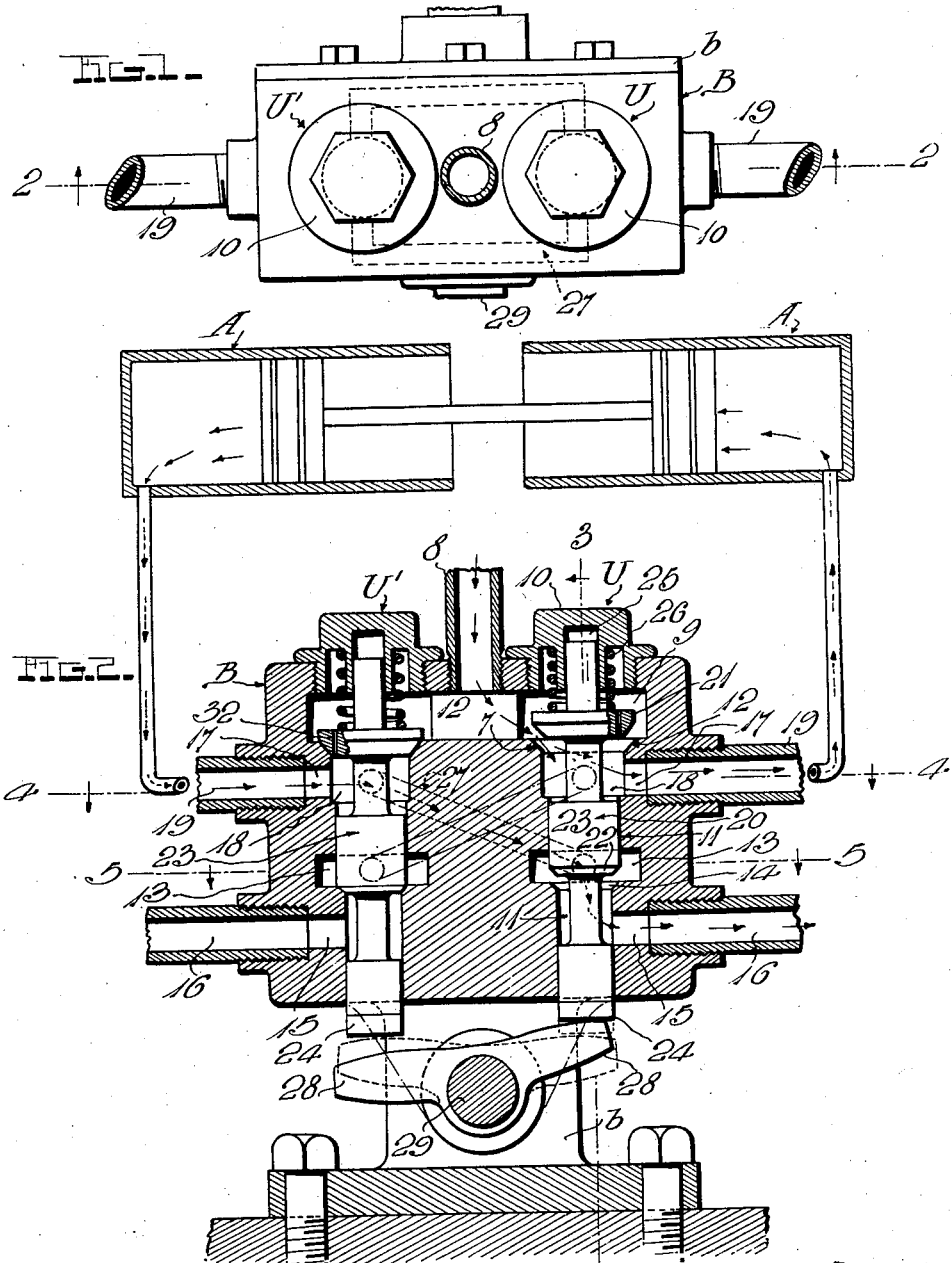

1,595,458

UNITED STATES PATENT OFFICE.

ROBERT L. DOOLITTLE AND WILLIAM C. HUNTER, OF MONTGOMERY, ALABAMA.

CONTROL VALVE.

Application filed October 12, 1925. Serial No. 62,135.

The invention relates to improvements in valves for controlling the admission of pressure to and the exhausting of pressure from cylinder and piston assemblies, and has reference more particularly to a valve, which places one end of the cylinder and piston assembly in communication with an exhaust while supplying pressure to the other end of said assembly, so that the piston may be moved to operate any mechanism with which it may be connected. The principal use of the device is in connection with pneumatic reverse gears for locomotives, although it is to be understood that the invention is not restricted to this particular field of use.

Control valves for the purpose herein set forth have heretofore been devised, but have been of expensive and complicated nature, usually embodying four disconnected valves, that is, a pressure admitting valve and a pressure exhausting valve for each end of the cylinder and piston assembly. It is the object of our invention, however, to greatly simplify and cheapen the construction of control valves, and in so doing, we make use of two dual valves and a simple arrangement of chambers and passages, to control the flow of the live and the exhaust pressure.

The dual valves above referred to, are normally closed, and a further aim is to provide bleed ports which by-pass the pressure admission valves, so as to equalize pressure in opposite ends of the cylinder and piston assembly, thus insuring that the piston shall remain in any position at which it may be set.

With the foregoing in view, the invention resides in the novel valve structure hereinafter described and claimed, the descriptive matter being supplemented by the accompanying drawings.

Figure 1 is an upper end view of a valve embodying our invention.

Figure 2 is a vertical longitudinal sectional view as indicated by line 2—2 of Fig. 1, the valve being diagrammatically connected with a cylinder and piston assembly.

Figure 3 is a vertical transverse sectional view as indicated by line 3—3 of Fig. 2.

Figures 4 and 5 are horizontal sections on lines 4—4 and 5—5 of Fig. 2.

Figure 6 is a perspective view of the valve body.

In the drawings above briefly described, B designates a valve body which may be stationarily supported in any desired manner, for instance, by a bracket $b$. This body is provided with live pressure admission means and with two duplicate valve units U and U', for controlling the supply of the pressure to either end of a cylinder and piston assembly A, as well as for controlling the discharge of exhaust pressure from said assembly. The pressure admission means, herein disclosed, comprises a passage 7 within the upper portion of the body B, and a pipe or the like 8 leading to said passage from a suitable source of pressure supply, preferably from a compressed air tank. The valve units U and U' for controlling the pressure, are duplicates as above stated, so that a description of the unit U will suffice for both.

A live pressure trapping chamber 9 is formed in the upper portion of the body B and has its upper end closed by a removable plug 10. A vertical bore 11 leads from the lower side of the chamber 9 to the lower end of the body B, the upper end of said bore being formed with a valve seat 12 for a pressure admission valve, said seat facing toward the chamber 9. Between this valve seat and the lower end of the body B, the bore 11 is enlarged to provide an exhaust pressure receiving chamber 13, and at the lower side of this chamber, the bore is formed with an exhaust valve seat 14 which faces in the same direction as the seat 12. Under the seat 14, an exhaust port 15 is formed in the body B and preferably connects with an exhaust pipe 16. Between the admission valve seat 12 and the chamber 13, a live pressure discharge port 17 leads from the bore 11, the portion of the bore from which said port 17 leads, being preferably enlarged somewhat and constituting a live pressure receiving chamber 18. A pipe or other passage member 19 leads from the port 17 to one end of the cylinder and piston assembly A.

A dual valve 20 is disposed longitudinally in the bore 11, said valve having a normally closed admission valve 21 and a normally closed exhaust valve 22. The valve 21 engages the seat 12 and normally prevents the escape of live pressure from the pressure trapping chamber 9 into the pressure receiving chamber 18. The valve 22 when seated upon the seat 14, prevents the escape of exhaust pressure from the chamber 13 to the port 15. Both valves 21 and 22 are so embodied in the dual valve 20, as to be bodily movable as a single unit. Between the chambers 13 and 18, the dual valve is provided with an enlarged, bore-closing portion 23 which prevents passage of live pressure from the chamber 18 through the bore and into the chamber 13. The lower end of the dual valve is projected downwardly beyond the body B in the present disclosure and is preferably provided with a hardened terminal 24. The upper end of this valve is by preference slidably engaged with a socket 25 in the plug 10, and we prefer to confine a compression spring 26 between said plug and the valve 21, said spring exerting its force to normally hold the dual valve 20 in such a position as to close both of the valves 21 and 22.

Completing the construction of the valve unit U is an exhaust pressure conducting passage 27 which leads from the live pressure receiving chamber 18 of the unit U, to the exhaust pressure-receiving chamber 13 of the other valve unit U'. In view of the fact that any of the reference characters 9 to 27, apply equally well to the unit U', some of them have been duplicated in connection with this unit.

For operating the two dual valves 20, we have shown rocker arms 28 projecting from a suitably mounted rock shaft 29. In the present showing, one end of this rock shaft is provided with a crank arm 30 connected with an operating member 31. This operating member may have some adequate connection with a portion of the reverse gear, as well as connection with a hand-control, so that the shaft 29 may be first turned by hand to open one or the other of the dual valves 23, and may then be mechanically controlled. The particular actuating means for the shaft 29, forms no part of this invention.

The rocker arms 28 underlie the two dual valves 20 and are normally in slightly spaced relation therewith to interfere in no manner with tight seating of all of the valves 21 and 22. By rocking the shaft 29 in the proper direction, it will be seen that either of these valves 23 may be opened, while the other remains closed. Thus, live pressure may be supplied to one end of the assembly A and simultaneously exhausted from the other end thereof, so as to effect adjustment of the piston of said assembly. When the valve 20 of the unit U is open, as shown in Fig. 2, live pressure from the pressure trapping chamber 9 passes into the live pressure receiving chamber 18 and from this chamber travels through the passage 17—19 to one end of the cylinder and piston assembly A. At the same time, exhaust pressure from the other end of the assembly A passes through the passage 19—17 of the valve unit U', and from the chamber 18 of this last named unit, the exhaust pressure flows through the pressure conducting passage 27 of said unit, into the exhaust pressure receiving chamber 13 of the unit U. As the valve 22 of this unit U has been opened simultaneously with opening of the pressure admission valve 21 thereof, the exhaust pressure escapes from the chamber 13 into the bore 11 and from the latter discharges through the exhaust passage 15—16. Obviously, when the dual valve 23 of the unit U' is opened, and the corresponding valve of the unit U is closed, reverse action will take place.

Normally, both valves 20 are closed. At this time, the piston of the assembly A stands in the position to which it has last been adjusted, and in order to effectively hold said piston against creeping, it is essential that counterbalanced pressure be produced in opposite ends of said assembly A. To accomplish this, we prefer to form a restricted bleed port 32 through each of the admission valves 21, said bleed ports by-passing said valves so as to obtain the desired result.

It will be seen from the foregoing that the invention is exceptionally simple and comparatively inexpensive, that it may be easily and advantageously manufactured, and that it will be highly efficient. On account of these advantages, flowing from the details of construction herein disclosed, such details are preferably followed. However, within the scope of the invention as claimed, numerous variations may be made.

We claim:—

1. A control valve comprising the body having live pressure admisison means and provided with two valve units; each of said units comprising a live pressure trapping chamber communicating with said admission means, a live pressure receiving chamber to receive live pressure from said trapping chamber, an exhaust pressure receiving chamber having an exhaust pressure outlet, a passage from said live pressure receiving chamber for connection to one end of a cylinder and piston assembly, an exhaust pressure conducting port from said live pressure receiving chamber to the exhaust pressure receiving chamber of the other of said valve units, and a dual valve having a normally closed admission valve for controlling discharge of live pressure from said trapping chamber into said live pressure receiving chamber, said dual valve being also provided with a normally closed exhaust valve for controlling passage of exhaust pressure from said exhaust pressure receiving chamber to said exhaust pressure outlet, said exhaust and admission valves being operatively connected for movement bodily as a single unit; and means for selectively opening said dual valves.

2. A control valve comprising a body having live pressure admission means and provided with two valve units; each of said units comprising a live pressure trapping chamber communicating with said admission means, a bore from said trapping chamber to an external surface of the body, the end of said bore at said trapping chamber having an admission valve seat which faces toward said chamber, said bore being enlarged between its ends to form an exhaust pressure receiving chamber and having an exhaust valve seat at one side of this chamber facing in the same direction as said admission valve seat, a live pressure conducting passage leading from said bore at a point between said admission valve seat and said exhaust pressure receiving chamber and adapted to lead to one end of a cylinder and piston assembly, an exhaust pressure conducting port leading from the bore at a point between said admission valve seat and said exhaust pressure receiving chamber, said exhaust pressure conducting port leading to the exhaust pressure receiving chamber of the other of said valve units, and a dual valve disposed longitudinally in said bore and having a normally closed admission valve co-operable with said admission valve seat to control passage of live pressure to said live pressure conducting passage, said dual valve also having a normally closed exhaust valve co-operable with said exhaust valve seat to control passage of exhaust pressure from said exhaust pressure receiving chamber, said dual valve being provided also with a bore-closing portion preventing passage of live pressure through the bore into said exhaust pressure receiving chamber, said admission and exhaust valves being operatively connected for movement bodily as a single unit; and means for selectively opening said dual valves.

3. A structure as specified in claim 1; together with bleed ports bypassing said pressure admission valves and establishing restricted communication between the live pressure trapping and receiving chambers for equalizing pressure in both ends of the cylinder and piston assembly when body dual valves are closed.

4. A structure as specified in claim 2; together with bleed ports bypassing said pressure admission valves and establishing restricted communication between the live pressure trapping and receiving chambers for equalizing pressure in both ends of the cylinder and piston assembly when both dual valves are closed.

In testimony whereof we have hereunto affixed our signatures.

ROBERT L. DOOLITTLE.
WILLIAM C. HUNTER.